(12) United States Patent
Austin

(10) Patent No.: US 6,865,544 B1
(45) Date of Patent: Mar. 8, 2005

(54) METHOD OF ADMINISTERING A REBATE SYSTEM

(75) Inventor: Gary M. Austin, Marietta, GA (US)

(73) Assignee: Health, Education & Retirement Organization, Inc. (HERO), Marietta, GA (US)

(*) Notice: Subject to any disclaimer, the term of this patent is extended or adjusted under 35 U.S.C. 154(b) by 257 days.

(21) Appl. No.: 09/309,834

(22) Filed: May 11, 1999

Related U.S. Application Data

(60) Provisional application No. 60/084,954, filed on May 11, 1998.

(51) Int. Cl.[7] .............................................. G06F 17/60
(52) U.S. Cl. ............................ 705/14; 705/10; 705/1; 705/20; 705/25; 705/26; 705/27
(58) Field of Search ........................................... 705/14

(56) References Cited

U.S. PATENT DOCUMENTS

| | | | |
|---|---|---|---|
| 4,750,119 A | | 6/1988 | Cohen et al. |
| 4,941,090 A | * | 7/1990 | McCarthy .................... 364/405 |
| 4,949,256 A | | 8/1990 | Humble |
| 5,056,019 A | | 10/1991 | Schultz et al. |
| 5,117,355 A | | 5/1992 | McCarthy |
| 5,185,695 A | | 2/1993 | Pruchnicki |
| 5,202,826 A | | 4/1993 | McCarthy |
| 5,287,268 A | | 2/1994 | McCarthy |
| 5,537,314 A | * | 7/1996 | Kanter ........................ 364/406 |
| 5,620,079 A | * | 4/1997 | Molbak ....................... 194/217 |
| 5,787,404 A | * | 7/1998 | Fernandez-Holmann ..... 705/35 |
| 5,794,210 A | * | 8/1998 | Goldhaber et al. ........... 705/14 |
| 5,806,045 A | * | 9/1998 | Biorge et al. ................. 705/14 |
| 6,223,168 B1 | * | 4/2001 | McGurl et al. ............... 705/40 |

FOREIGN PATENT DOCUMENTS

JP    SHO 55-47560    4/1980

OTHER PUBLICATIONS

Wired for Soles by Betty Sprethmann, Promo, p. 51, Mar. 1997, Dialog file 570, record# 01605653.*
http://www.opm.gov/perform/articles/069.htm#Savings Bonds Workforce performance, A newsletter reprint, A Closer Look at Nonmonetary Awards: Rewarding With Certificates and Bonds, The fourth in a series of articles addressing nonmonetary awards Oct. 1997.*
Black's Law Dictionary with Pronunciations, 6th Edition, pp 1508–1514.*

* cited by examiner

Primary Examiner—James W. Mythre
(74) Attorney, Agent, or Firm—Needle & Rosenberg, P.C.

(57) ABSTRACT

In a method of administering a rebate system, rebate-related information is electronically transmitted from a rebate issuing entity and is received by a central processing authority. The rebate-related information includes information identifying a consumer and information relating to a purchase made by the consumer from the rebate issuing entity. The central authority determines an amount of a rebate that is to be credited to the consumer, based on information previously provided by the rebate issuing entity. The rebate issuing entity is invoiced for the amount of the rebate, wherein the amount is payable to an omnibus trust account, wherein a trustee has exclusive control over the omnibus trust account and the trustee is authorized to transfer a credit from the omnibus trust account to the consumer.

20 Claims, 3 Drawing Sheets

METHOD OF ADMINISTERING A REBATE SYSTEM

CROSS REFERENCE TO A RELATED PROVISIONAL APPLICATION

This application claims priority on Provisional Application Ser. No. 60/084,954, which was filed on May 11, 1998.

REFERENCE TO A MICROFICHE APPENDIX

This application was filed with a microfiche appendix comprising 7 fiches and 367 frames.

BACKGROUND OF THE INVENTION

1. Field of the Invention

This invention relates to rebate systems. More particularly, this invention relates to a method of administering a rebate system wherein cash value of a rebate is placed in an omnibus trust account.

2. The Prior Art

Rebate incentive programs provide sponsoring companies an opportunity to promote the sales of the sponsoring company's products or services. Such programs involve a participant purchasing a product from a merchant and then receiving a rebate from the sale. For example, with an instant rebate if one buys a product, the merchant credits the purchaser so that the consumer pays less than the marked price for the product. Some rebates require the consumer to purchase the product then mail a form to a rebate clearing house to receive the rebate. Such rebates provide an immediate incentive to the purchaser. However, they have the disadvantages of not providing an incentive for regular brand loyalty and not providing feedback to the merchant regarding the buying habits of the consumer. Furthermore, mail-away rebates have the disadvantage of requiring the consumer to expend extra effort to secure the rebate, making the product less desirable to the consumer.

Rebate cards provide a merchant the ability to grant rebates on every purchase of a product. Such rebate cards typically include a magnetic stripe that includes purchase-relevant information. Typically, such information includes an account identifier and demographic information about the consumer. In using a rebate card, the consumer presents the card at the point of sale, the card is swiped through a card reader, the information is transmitted to a central computer and the computer credits the consumer's rebate account. At a later date, the rebates accumulated over a predetermined period of time are disbursed to the consumer in the form of a check. Such rebate cards usually are merchant-specific and, therefore, the consumer has a relatively low incentive to use them. Some proposed rebate card systems would allow several different merchants to subscribe to a system, which accumulates rebates from all of the merchants, thereby allowing accumulation of a sizeable amount. However, such systems have the disadvantage of not storing the accumulated rebates in an independent and secure institution. Therefore, they have the perception of being unreliable and may not be workable under current regulatory environments.

Nowhere does the prior art disclose a method of administering a rebate card wherein the total accumulated cash value of a consumer's rebates is stored in an omnibus trust account.

SUMMARY OF THE INVENTION

The above-noted disadvantages of the prior art are overcome by the present invention, which in one aspect is a method of administering a rebate system in which rebate-related information is electronically transmitted from a rebate issuing entity and is received by a central processing authority. The rebate-related information includes information identifying a consumer and information relating to a purchase made by the consumer from the rebate issuing entity. The central authority determines an amount of a rebate that is to be credited to the consumer, based on information previously provided by the rebate issuing entity. The rebate issuing entity is invoiced for the amount of the rebate, wherein the amount is payable to an omnibus trust account, wherein a trustee has exclusive control over the omnibus trust account and the trustee is authorized to transfer a credit from the omnibus trust account to the consumer.

In another aspect, the invention is a computer for administering a rebate system. The computer is programmed to accept information received electronically, including indicia of a consumer and indicia of a purchase made by the consumer from a rebate issuing entity. The computer determines an amount corresponding to a rebate based on the information accepted from the electronic card reader and on information previously provided by the rebate issuing entity. Then it generates a record of an invoice for transmittal to the rebate issuing entity that sets forth an amount payable by the rebate issuing entity corresponding to the rebate. Upon an indication that the rebate issuing entity has paid the amount, the computer generates a command to transfer the amount of the rebate to an omnibus trust account, wherein the omnibus trust account is held by a trustee for the benefit of the consumer. Then, upon an indication of a preselected criterion, the computer will generate an authorization that instructs the trustee to transfer a credit from the omnibus trust account to a receiving entity.

These and other aspects will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
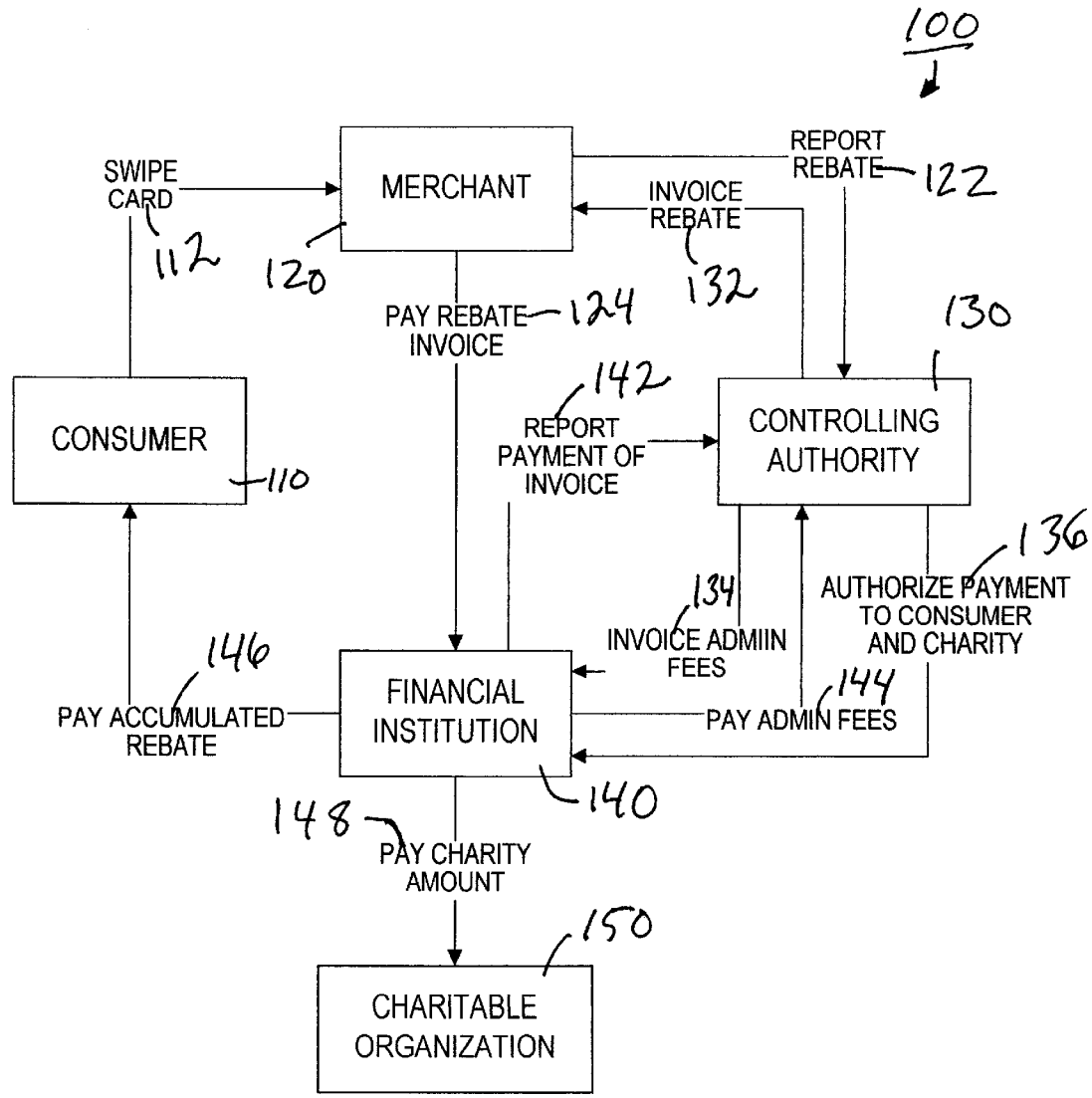
FIG. 1 is a block diagram showing the relationships between the entities employing the invention.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

As shown in FIG. 1, the invention 100 involves the interrelationship of several entities, including: at least one consumer 110, at least one merchant 120, or other rebate issuing entity (e.g., a shopping center, a mall, a manufacturer, a financial institution, etc.); a controlling authority 130 (such as a rebate program management company); a financial institution 140; and a charitable organization 150. The consumer 110 is issued a rebate card by the controlling authority 130 that entitles the consumer 110 to rebates from the merchant 120 on some or all of the consumer's 110 purchases. The merchant 120 is a subscriber to the controlling authority's 130 system, but pays the rebates to the financial institution 140. The financial institution 140 receives rebate funds from the merchant 120, which are allowed to accumulate and which the financial institution 140 subsequently pays to the consumer 110.

Because many different types of rebate issuing entities could employ the invention, it is understood that the invention does not merely support merchant-specific rebate plans, but allows for a variety of rebate plans. For example, a shopping mall could have a set rebate for all of the purchases made at every store at the mall. Similarly, an auto dealer could offer one rebate for purchases of new cars (e.g. 0.6%); another rebate for purchases of trucks (e.g. 0.9%); another for purchases of used cars (e.g. 2.0%); and still another rebate for parts and service (e.g. 5.0%).

In operation, the consumer 110 makes purchases from a subscribing merchant 120, who swipes 112 the consumer's 110 rebate cart through a card reader and issues a receipt documenting the rebate to the consumer 110. Generally, the merchant will provide the consumer 110 a receipt memorializing the transaction and entitlement to a rebate. Typically the card reader reads information from the card, including information identifying the consumer 110 and information relating to the purchase (e.g., information indicating the cash amount of purchase, the skew numbers of the goods being sold, the location of the sale, an identification of the department making the sale, etc.) and transfers the information to a central transaction accumulator, or other such electronic system. Periodically, the transaction accumulator reports 122 this rebate-related information, along with information regarding other rebates, to the controlling authority 130. The controlling authority 130 would be a central rebate transaction management organization that handles rebates from several different merchants.

The controlling authority 130 determines the amount of the rebate that is to be credited to the consumer 110 account, based on information previously provided by the merchant 120. Such information could include: a rebate that is to be applied to various goods; a graduated rebate that depends on the amount spent; a rebate that is to be applied to certain classes of goods; and any other scenario under which a rebate is to be applied to the purchase of goods. The controlling authority 130 will invoice 132 the merchant 120 for the amount of the rebate.

The merchant 120 then pays 124 the invoiced amount of the rebate to the financial institution 140, which then puts the amount in an omnibus trust account wherein a trustee has exclusive control over the trust account. If the payment is made by check, it is sent to a lock-box entity, which ensures that the check clears and that there are no charge-backs. Once the funds for the rebate have been received, they are transferred into the trust account. If the payment is made through an electronic funds transfer, then the funds are directly transferred into the trust account. For the sake of efficiency, an omnibus trust account is employed, thereby relieving the financial institution 140 from expending the overhead associated with maintaining individual accounts for each participating consumer 110. Upon receipt of the payment 124, the financial institution 140 reports 142 payment of the invoice to the controlling authority 130, or an accounting entity, which maintains a record of all rebates due each consumer 110.

Periodically, the controlling authority 130 will invoice 134 the trustee for the administrative fees incurred in running the program. The financial institution 140 will then pay 144 the administrative fees to the controlling authority 130. Also, the controlling authority 130 will periodically authorize 136 payment by the trustee of an accumulated rebate to the consumer 110, as well as payment of a portion of the accumulated rebate to a charitable organization 150 (if the consumer 110 so desires). If instructed to do so by the trustee, the financial institution 140 will determine the portion to be paid to the charitable organization 150 (based on the consumer's 110 instructions) and will pay 148 that amount to the charitable organization 150. The consumer 110 may be allowed to select which of several charitable organizations is to receive the portion of the accumulated rebate. Once paid, the financial institution 140 or the controlling authority 130 will issue a receipt for the charitable contribution, allowing the consumer 110 to claim a tax deduction. The financial institution 140 will then pay 146 the remainder of the accumulated rebate due to the consumer 110. The transfer to the consumer 110 could be in the form of, e.g., a draft for a cash amount or in the form of a savings bond.

Figure 2:
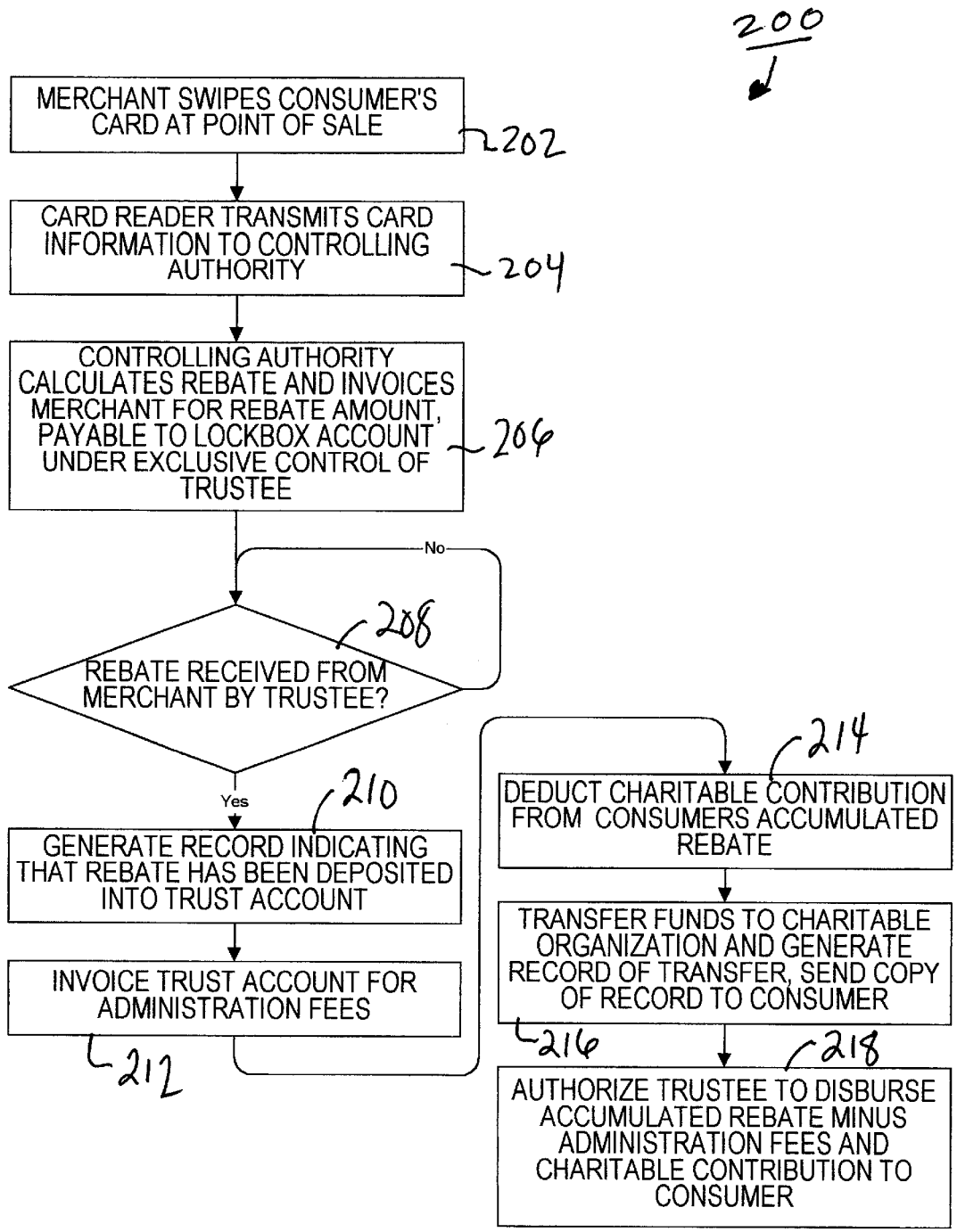
FIG. 2 is a flow chart showing the operations performed with the invention.

As shown in FIG. 2, the invention may be implemented as a computer program 200, that includes the following operations: once the merchant swipes 202 the consumer's rebate card, the card reader transmits 204 the information about the sale to the controlling authority. The computer then accepts the information from the electronic card reader, or transaction accumulator, and calculates 206 the amount corresponding to a rebate based on the information accepted from the electronic card reader and on information previously provided by the merchant. The computer also generates a record of an invoice for transmittal to the merchant that sets forth an amount payable by the merchant corresponding to the rebate. The computer performs a test 208 to determine if the merchant has paid the rebate. If the merchant has not paid, then the computer waits until paid. If the merchant has paid, then the computer generates a command 210 to transfer the amount of the rebate to an omnibus trust account and generates a record of the transfer. The computer will also invoice 212 the trust account for administrative fees.

Periodically, or upon receiving an indication of other preselected criteria, the computer will deduct 214 the charitable contribution from the record of the consumers accumulated rebate and generate an instruction to the trustee to pay that amount to the charitable organization 216. A record of the transfer will be sent to the consumer, thereby providing the consumer with a mechanism for claiming a tax deduction for the rebate. The computer will then authorize 218 the trustee to disburse the accumulated rebate due the consumer, minus any administration fees and minus the amount of the charitable contribution.

If the computer is instructed to pay the rebate periodically, it will perform the following computer-executable operations: determine a current date; compare the current date to an anniversary date that is a preselected date (e.g., the consumer's birthday) plus a preselected period (e.g., yearly, monthly or quarterly) after the preselected date. If the current date is the same or after the anniversary date then the computer generates an indication that the preselected criterion has been met and the trustee will be instructed to pay out the rebate.

Figure 3:
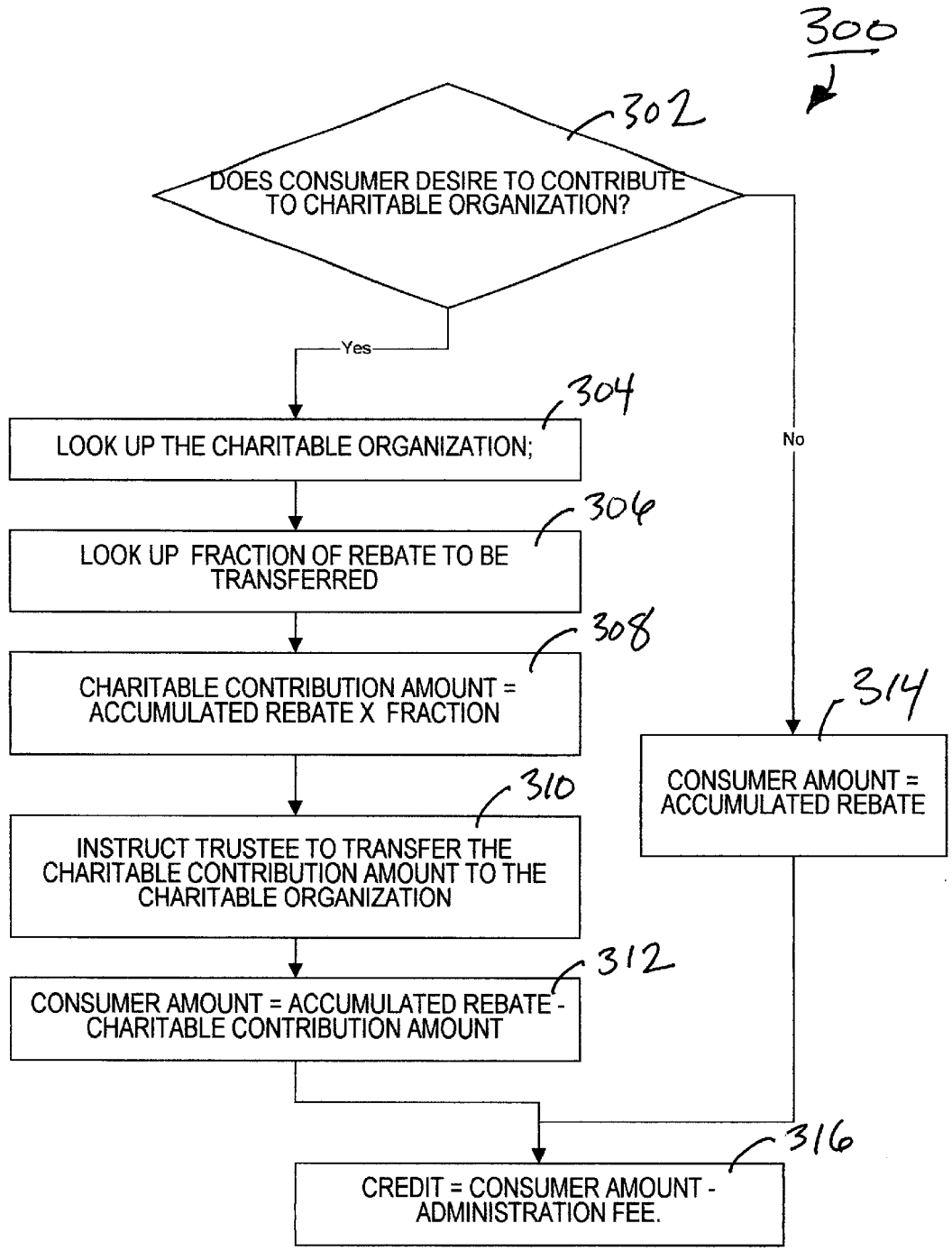
FIG. 3 is a flow chart showing the operations performed in determining amounts to be disbursed.

As shown in FIG. 3, when the controlling authority instructs the trustee to transfer a credit from the omnibus trust account to a receiving entity (e.g., the consumer or a charitable organization) the computer executes the following operations 300: perform a test 302 to determine if the consumer has indicated a desire to transfer a portion of the credit to a charitable organization. If the test 302 indicates the consumer desires to transfer a portion of the credit to a charitable organization, then the computer will perform the following computer-executable operations: look up an identification of the charitable organization 304; look up a fraction rebate corresponding to the portion to be transferred 306; calculate a charitable contribution amount to be transferred to the charitable organization so as to equal the accumulated rebate multiplied by the fraction 308; generate an authorization that instructs the trustee to transfer the charitable contribution amount to the charitable organization 310; calculate a consumer amount to be transferred to the consumer so as to equal the accumulated rebate minus the charitable contribution amount 312. If, on the other hand, the test 302 indicates the consumer does not desire to transfer a portion of the credit to a charitable organization, then the computer sets 314 the consumer amount equal to the accumulated rebate. The computer then calculates the credit 316 so as to equal the consumer amount minus an administration fee.

The microfiche appendix discloses a functional design for the database employed in one commercial embodiment of the invention. The disclosed design would operate as an ORACLE® database, which would typically run on a computer employing the WINDOWS-NT® operating system running on a PENTIUM®-based processor. It will be understood that the disclosed embodiment could employ any one of many combinations of database programs, operating systems and processors without departing from the scope of the invention.

The above described embodiments are given as an illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. A method of administering a rebate system, comprising the steps of:
   a. a controlling authority receiving rebate-related information electronically transmitted from a rebate issuing entity, the rebate-related information including:
      i. information identifying a consumer;
      ii. information relating to a purchase made by the consumer from the rebate issuing entity; and
      iii. information identifying the rebate issuing entity;
   b. the controlling authority calculating an amount of a rebate that is to be credited to the consumer, based on information previously provided by the rebate issuing entity and at least a portion of the rebate-related information;
   c. the controlling authority controlling transfer of the amount of the rebate, to an omnibus trust account; and
   d. the controlling authority authorizing a financial institution trustee to transfer a credit from the omnibus trust account directly to the consumer.

2. The method of claim 1, further comprising the step of issuing a receipt documenting the rebate to the consumer.

3. The method of claim 1, further comprising the step of invoicing the trustee for an administration fee.

4. The method of claim 1, wherein the information relating to a purchase includes an identification of a cash amount of the purchase.

5. The method of claim 1, wherein the transferring step occurs after the amount of the rebate is received from the rebate issuing entity.

6. The method of claim 1, wherein the authorizing step comprises authorizing the trustee to transfer the credit periodically.

7. The method of claim 1, wherein the credit of the authorizing step comprises a savings bond.

8. The method of claim 1, wherein the credit of the authorizing step comprises a draft for a cash amount.

9. The method of claim 1, further comprising the step of authorizing the trustee to transfer a credit from the omnibus trust account to a charity.

10. The method of claim 9, further comprising the step of allowing the consumer to select the charitable organization.

11. The method of claim 9, further comprising the step of indicating to the consumer the credit transferred to the charity, thereby providing the consumer with a mechanism to receive a tax deduction for the credit transferred to the charitable organization.

12. A computer program for administering a rebate system stored in a computer-readable memory, comprising the following computer-executable operations:
   a. accept information from an electronic system, including indicia identifying a consumer and indicia of a purchase made by the consumer from a rebate issuing entity;
   b. calculate an amount corresponding to a rebate based on the information accepted from the electronic system and on information previously provided by the rebate issuing entity;
   c. generate a record for transmittal to the rebate issuing entity;
   d. generate a record indicating the amount of the rebate has been deposited into an omnibus trust account, wherein the omnibus trust account is held by a financial institution trustee for the benefit of the consumer; and
   e. add the amount of the rebate to a record of an accumulated rebate; and
   f. upon an indication of a preselected criterion, generate an authorization that instructs the financial institution trustee to transfer a credit based on the accumulated rebate from the omnibus trust account to a receiving entity designated by the consumer.

13. The computer program of claim 12, wherein when computer determines the indication of the preselected criterion it performs the following computer-executable operations:
   a. determine a current date;
   b. compare the current date to an anniversary date that is a preselected date plus a preselected period after the preselected date;
   c. if the current date is the same or after the anniversary date then generate an indication that the preselected criterion has been met.

14. The computer program of claim 12, wherein the operation instructing the trustee to transfer a credit from the omnibus trust account to a receiving entity comprises the following computer-executable operations:
   a. perform a test to determine if the consumer has indicated a desire to transfer a portion of the credit to a charitable organization;
   b. if the test indicates the consumer desires to transfer a portion of the credit to a charitable organization, then perform the following computer-executable operations:
      i. look up an identification of the charitable organization;
      ii. look up a fraction of the accumulated rebate corresponding to the portion to be transferred;

iii. calculate a charitable contribution amount to be transferred to the charitable organization so as to equal the amount in the accumulated rebate multiplied by the fraction;
iv. generate an authorization that instructs the trustee to transfer the charitable contribution amount to the charitable organization;
v. calculate a consumer amount to be transferred to the consumer so as to equal the accumulated rebate minus the charitable contribution amount;

c. if the test indicates the consumer does not desire to transfer a portion of the credit to a charitable organization, then set the consumer amount equal to the accumulated rebate; and d. calculate credit so as to equal the consumer amount minus an administration fee.

15. A system for administering consumer rebates, comprising:

a. means for a controlling authority to receive rebate-related information from a rebate issuing entity and transmitted electronically, the rebate-related information including:
   i. information identifying a consumer;
   ii. information relating to a purchase made by the consumer from the rebate issuing entity;
   iii. information identifying the rebate issuing entity;

b. means for the controlling authority to determine an amount of a rebate that is to be credited to the consumer, based on information previously provided by the rebate issuing, entity and at least a portion of the rebate-related information;

c. means for the controlling authority to control transfer of the amount of the rebate to an omnibus trust account; and d. means for the controlling authority to authorize a financial institution trustee to transfer a credit from the omnibus trust account directly to the consumer.

16. The system of claim 15, further comprising means for issuing a receipt to the consumer memorializing the rebate.

17. The system of claim 15, further comprising means for invoicing the trustee for an administration fee.

18. The system of claim 15, further comprising means for authorizing the trustee to transfer a credit from the omnibus trust account to a charity.

19. The system of claim 18, further comprising means for allowing the consumer to select the charity.

20. The system of claim 18, further comprising means for indicating to the consumer the credit transferred to the charity, thereby providing the consumer with a mechanism to receive a tax deduction for the credit transferred to the charity.

* * * * *